US010362153B2

(12) United States Patent
Shem Tov et al.

(10) Patent No.: US 10,362,153 B2
(45) Date of Patent: Jul. 23, 2019

(54) METHOD AND APPARATUS TO PROVIDE DIRECT ACCESS TO ONE OR MORE SENSORS FROM AN INTERNET PROTOCOL NETWORK (71) Applicant: MOTOROLA SOLUTIONS, INC., Schaumburg, IL (US)

(72) Inventors: Jacob Shem Tov, Jerusalem (IL); Ido Merkado, Tel Aviv-Yaffo (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 253 days.

(21) Appl. No.: 15/193,237

(22) Filed: Jun. 27, 2016

(65) Prior Publication Data
US 2017/0373952 A1 Dec. 28, 2017

(51) Int. Cl.
H04L 12/26 (2006.01)
H04L 29/08 (2006.01)
H04W 4/80 (2018.01)
H04L 29/12 (2006.01)

(52) U.S. Cl.
CPC ............ *H04L 69/329* (2013.01); *H04L 67/12* (2013.01); *H04W 4/80* (2018.02); *H04L 61/2007* (2013.01)

(58) Field of Classification Search
CPC ......... H04L 2012/2841; H04L 63/1408; H04L 12/2827; H04L 12/2825; H04L 67/02; H04L 12/2818; H04L 12/66; H04W 24/00; H04W 4/18; H04W 4/70; H04W 92/00
See application file for complete search history.

(56) References Cited

U.S. PATENT DOCUMENTS

| 9,297,925 | B1 * | 3/2016 | Riley | G01W 1/00 |
| 2004/0075566 | A1 * | 4/2004 | Stepanik | G08B 21/12 340/632 |
| 2012/0269092 | A1 * | 10/2012 | Hansen | H04L 61/2517 370/254 |
| 2013/0283364 | A1 * | 10/2013 | Chang | H04L 49/70 726/12 |
| 2014/0036675 | A1 * | 2/2014 | Wang | G06F 9/52 370/235 |
| 2015/0180920 | A1 * | 6/2015 | Hunter | H04L 67/025 709/203 |

(Continued)

Primary Examiner — Sm A Rahman
Assistant Examiner — Ranjan Pant
(74) Attorney, Agent, or Firm — Michael Best & Friedrich LLP (57) ABSTRACT A method and apparatus for providing direct access to one or more sensors from an internet protocol network. One example method includes detecting, by the remote terminal unit, a first sensor coupled to a first communications port. The method also includes generating a first unique internet protocol address for the first sensor, and mapping the first unique internet protocol address, at an application layer of a network protocol stack, to the first sensor. The method includes broadcasting, over the internet protocol network at a network layer, the first unique internet protocol address and an identity of the first sensor with which the first unique internet protocol address is associated. The method includes monitoring, at the network layer of the internet protocol network, for a sensor message identifying the first unique internet protocol address as a destination address, and forwarding the sensor message to the application layer for further processing.

16 Claims, 4 Drawing Sheets (56) References Cited

U.S. PATENT DOCUMENTS

| | | | |
|---|---|---|---|
| 2016/0087889 A1* | 3/2016 | Chandrasekaran | ............................ H04L 12/4625 370/389 |
| 2016/0120144 A1* | 5/2016 | Kim | ..................... A01K 1/0047 119/437 |
| 2016/0131686 A1* | 5/2016 | Handley | ................... G05F 1/00 324/76.11 |
| 2017/0094033 A1* | 3/2017 | Sathyadevan | ........... H04W 4/70 |

\* cited by examiner

METHOD AND APPARATUS TO PROVIDE DIRECT ACCESS TO ONE OR MORE SENSORS FROM AN INTERNET PROTOCOL NETWORK

BACKGROUND OF THE INVENTION

Remote monitoring and control systems (for example, supervisory control and data acquisition (SCADA) systems, Internet of Things (IoT) systems, and Industrial Internet of Things (IIoT) systems), issue commands to remotely control equipment or processes (for example, by activating or deactivating equipment or functions). Such systems may be used to monitor and control industrial processes (for example, manufacturing), infrastructure processes (for example, water treatment and distribution), facility processes (for example, interior climate control and other building management processes), and other automatable processes. For example, a supervisory control and data acquisition system may be used to monitor water pressure at various points in a water distribution system, and to control a pump to fill a water tower when water pressure readings fall below a threshold level. In many instances, control and data acquisition is based on information gathered from remote sensors. Remote sensors monitor conditions (for example, temperature, pressure, humidity, water levels, equipment status, and the like), which may affect, or may be affected by, the equipment or process being controlled.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One exemplary embodiment provides a method for providing direct access to one or more sensors from an internet protocol network via a remote terminal unit coupled to the internet protocol network. The method includes detecting, by the remote terminal unit, a first sensor coupled to a first communications port of the remote terminal unit. The method further includes generating, by the remote terminal unit, a first unique internet protocol address for the first sensor. The method further includes mapping the first unique internet protocol address, at an application layer of a network protocol stack of the remote terminal unit, to the first sensor. The method further includes broadcasting, by the remote terminal unit over the internet protocol network at a network layer, the first unique internet protocol address and an identity of the first sensor with which the first unique internet protocol address is associated. The method further includes monitoring, by the remote terminal unit at the network layer of the internet protocol network, for a sensor message identifying the first unique internet protocol address as a destination address of the message. The method further includes, responsive to detecting the sensor message, forwarding the sensor message to the application layer for further processing.

Another embodiment provides a remote terminal unit for providing direct access to one or more sensors from an internet protocol network. The remote terminal unit includes a network interface coupled to the internet protocol network, a first communications port, a memory, and an electronic processor coupled to the network interface, the first communications port, and the memory, and configured to detect a first sensor coupled to the first communications port. The electronic processor is further configured to generate a first unique internet protocol address for the first sensor. The electronic processor is further configured to map the first unique internet protocol address, at an application layer of a network protocol stack of the remote terminal unit, to the first sensor. The electronic processor is further configured to broadcast, via the network interface, over the internet protocol network at a network layer, the first unique internet protocol address and an identity of the first sensor with which the first unique internet protocol address is associated. The electronic processor is further configured to monitor, via the network interface, at the network layer of the internet protocol network, for a sensor message identifying the first unique internet protocol address as a destination address of the message. The electronic processor is further configured to, responsive to detecting the sensor message, forward the sensor message to the application layer for further processing.

For ease of description, each of the exemplary systems presented herein is illustrated with a single exemplar of each of its component parts. Some examples may not describe or illustrate all components of the systems. Other exemplary embodiments may include more or fewer of each of the illustrated components, may combine some components, or may include additional or alternative components.

In many existing remote monitoring and control systems, so-called "dumb" sensors are coupled to a remote terminal unit. The remote terminal unit is assigned an internet protocol (IP) address. Control terminals connected (for example, via one or more networks) to the remote terminal unit are used to monitor the sensors via that internet protocol address, using specific protocols (for example, the Modbus protocol). Configuration of the control terminals is required. For each sensor, the control terminals are configured with, among other things, the IP address of the remote terminal unit, the physical address of the sensor at the remote terminal unit, the sensor type, and the sensor data format.

Any replacement or movement of a single sensor requires reconfiguration of all control terminals currently configured to monitor the sensor.

Figure 1:
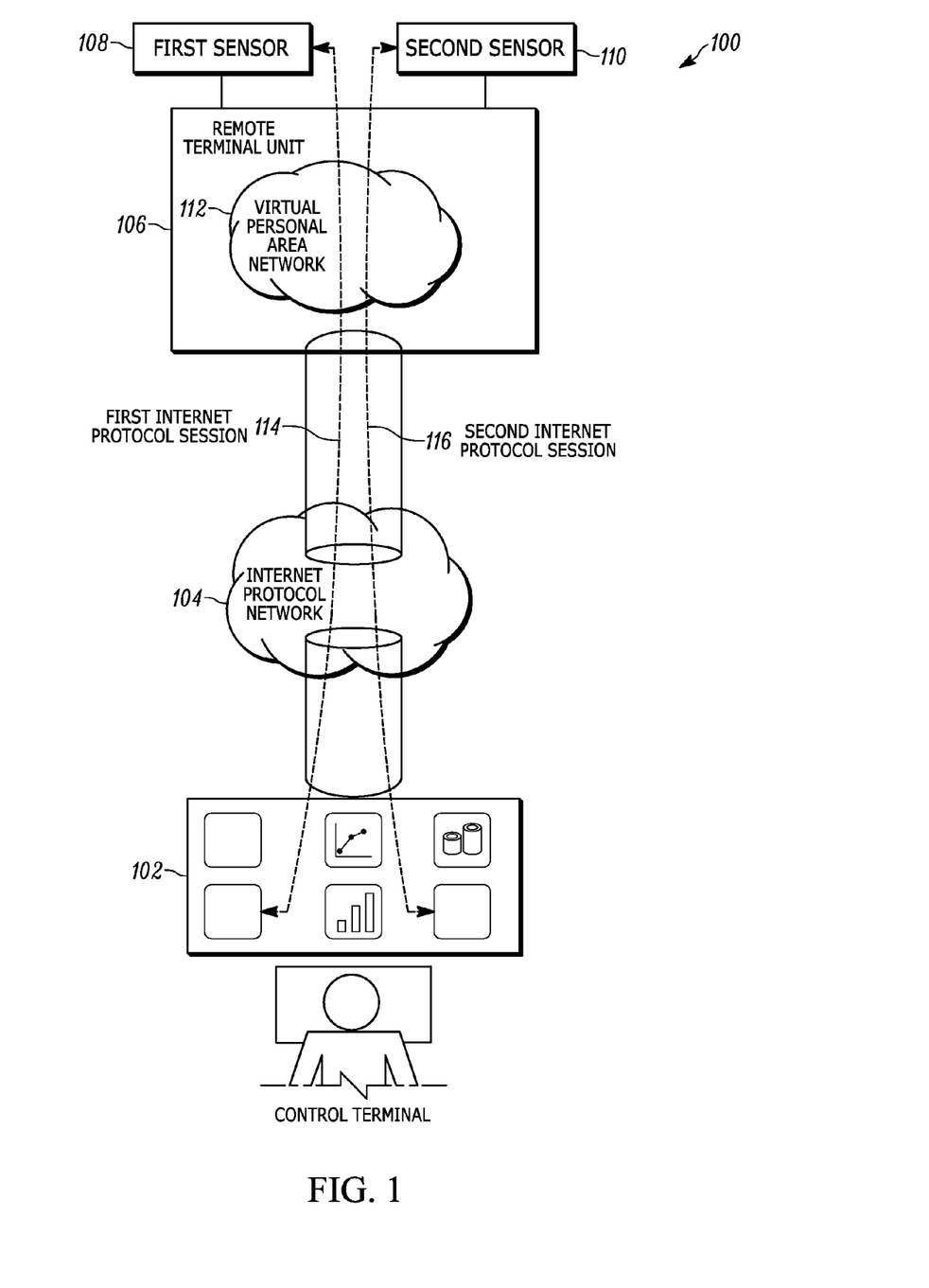
FIG. 1 is a diagram of a remote monitoring and control system for providing direct access to one or more sensors in accordance with some embodiments.

FIG. 1 is a diagram of one embodiment of a remote monitoring and control system 100. In the example illustrated, the remote monitoring and control system 100 includes a control terminal 102, an internet protocol network 104, a remote terminal unit 106, a first sensor 108, and a second sensor 110.

The control terminal 102 provides a human machine interface (HMI) to the remote monitoring and control system 100. In one example, the control terminal 102 is a computer having devices to receive input from an operator (for example, a keyboard, mouse, or touchscreen) and devices to provide output to the operator (for example, one or more display screens). The control terminal 102 is communicatively coupled to the remote terminal unit 106 via the internet protocol network 104. As described in detail below, the control terminal 102 sends and receives data and control signals to and from the remote terminal unit 106 via the internet protocol network 104. In other embodiments, the control terminal 102 may be a computer server, a mobile computing device (for example, a smart telephone), or other electronic device capable of operating as described herein. In some embodiments, the control terminal 102 may include, or be configured to communicate with, cloud-based backend services (for example, for data storage and retrieval).

The internet protocol network 104 may be a wired or wireless network, operating according to suitable internet protocols (for example, Transmission Control Protocol (TCP), Internet Protocol (IP), and User Datagram Protocol (UDP)). The terms "internet protocol" and "internet protocols," as used herein, may refer to Internet Protocol version 4 (IPv4), Internet Protocol version 6 (IPv6), future-developed internet protocols, or some combination of the foregoing. All or parts of the internet protocol network 104 may be implemented using one or more existing networks, for example, a cellular network, the Internet, a land mobile radio (LMR) network, a short-range (for example, Bluetooth™) wireless network, a wired or wireless wide area network (WAN), a wireless local area network (for example, Wi-Fi), and a public switched telephone network (PSTN). The internet protocol network 104 may also include future-developed networks. In some embodiments, communications with other external devices (not shown) occurs over the internet protocol network 104.

The remote terminal unit 106, described in greater detail below, is communicatively coupled to the internet protocol network 104, the first sensor 108, and the second sensor 110. In one example, the remote terminal unit 106 implements a virtual personal area network (PAN) 112, which operates using internet protocols, and maps a first unique internet protocol address to the first sensor 108 and a second unique internet protocol address the second sensor 110. As described in greater detail below, the virtual personal area network 112 enables internet protocol communication between the control terminal 102 and the first sensor 108 (for example, over the internet protocol session 114), and the control terminal 102 and the second sensor 110 (for example, over the second internet protocol session 116), using the respective unique internet protocol addresses.

In the example illustrated, the first sensor 108 is a "dumb" sensor coupled to the remote terminal unit 106 via a wired connection. Generally, a "dumb" sensor can sense its surroundings or a particular phenomenon and provide an output that represents sensed activity, but a "dumb" sensor does not contain communication capabilities that would allow it to communicate with multiple other devices. In some embodiments, the first sensor 108 may be capable of communicating to a single device (for example, the remote terminal unit 106) via a wired serial communications link. The first sensor 108 may be an electronic or electromechanical device (for example, a transducer), which detects changes in a characteristic (for example, temperature, pressure, magnetic flux, light intensity, resistance, capacitance, voltage, current, and the like) of the environment near the transducer, and produces an electrical signal (for example, an alternating current) proportional or otherwise related to the detected changes. In some embodiments, the first sensor 108 is an electronic or electromechanical device (for example, a switch), which detects an electrical or mechanical state. For example, the first sensor 108 may sense when an electrical connection is made or broken. In another example, the first sensor 108 may detect whether a panel is open or closed, or when water or fluid has reached a certain level. Some embodiments include three or more sensors coupled to the remote terminal unit 106. The first sensor 108 and the second sensor 110, as well as any additional sensors, may all be of the same type, or may include different combinations of the types of sensors described, as well as other sensor types not listed.

Figure 2:
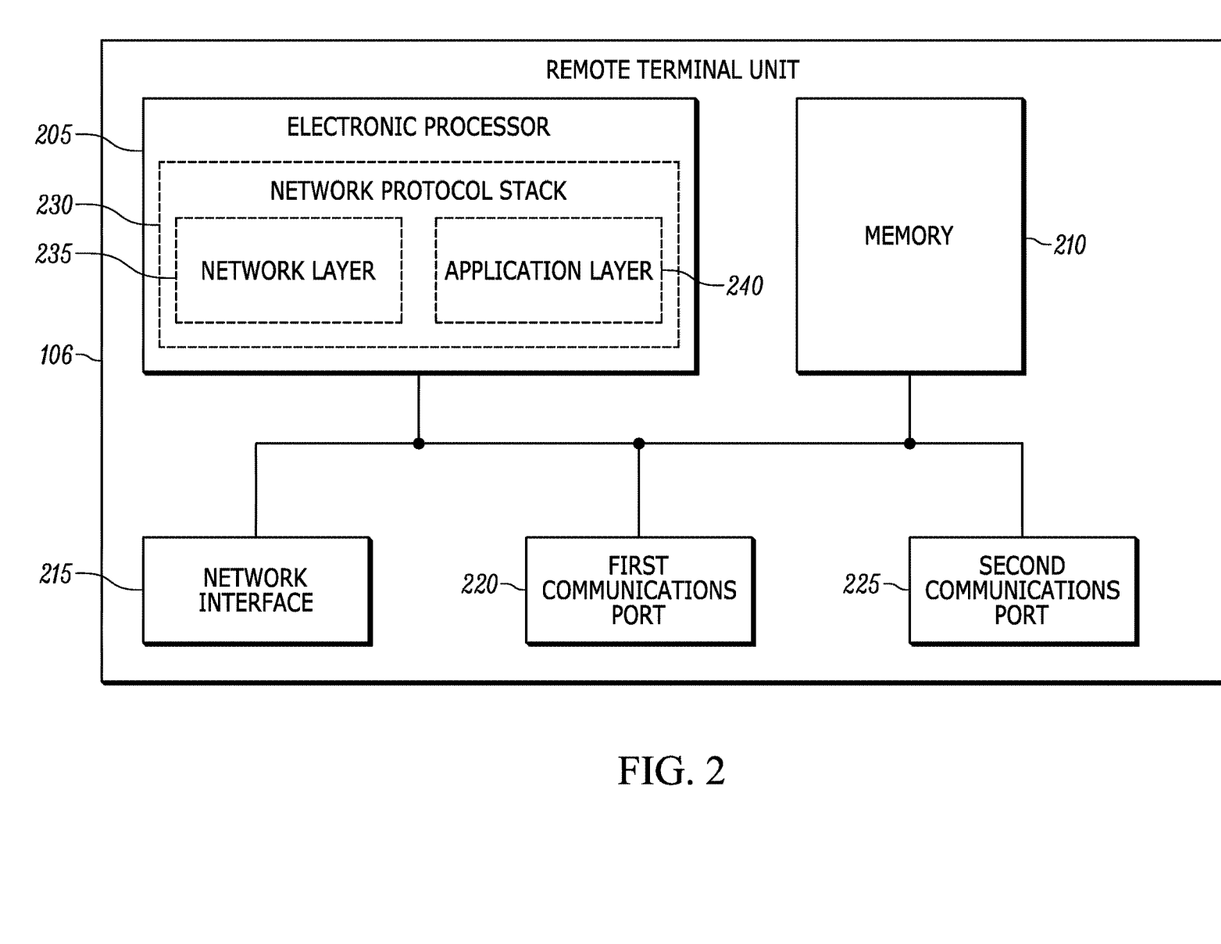
FIG. 2 is a diagram of the remote terminal unit of FIG. 1 in accordance with some embodiments.

FIG. 2 is a diagram of one embodiment of the remote terminal unit 106. In the embodiment illustrated, the asset management controller 16 includes an electronic processor 205 (for example, a microprocessor, or other electronic controller), a memory 210, a network interface 215, a first communications port 220, and a second communications port 225. The electronic processor 205, the memory 210, the network interface 215, the first communications port 220, and the second communications port 225, as well as the other various modules are coupled directly, by one or more control or data buses, or a combination thereof.

The memory 210 may include read-only memory (ROM), random access memory (RAM), other non-transitory computer-readable media, or a combination thereof. The electronic processor 205 is configured to retrieve instructions and data from the memory 210 and execute, among other things, instructions to perform the methods described herein.

The electronic processor 205 executes a network protocol stack 230, which operates according to internet protocols (for example, transmission control protocol/internet protocol (TCP/IP)) to enable communications within and without the remote terminal unit 106. As can be appreciated by one skilled in the art, the network protocol stack 230 operates using layers (for example, as specified in the Internet Engineering Task Force (IETF) Request for Comments (RFC) 1122), and includes at least a network layer 235 and an application layer 240. The electronic processor 205 controls the network interface 215 to send and receive data over the internet protocol network 104 (See FIG. 1). For example, the network interface 215 may include a transceiver for wirelessly coupling to the internet protocol network 104. Alternatively, or in addition, the network interface 215 may include a connector or port for receiving a wired connection (for example, Ethernet) to the internet protocol network 104.

The first communications port 220 is electrically coupled to the first sensor 108 (See FIG. 1), receives electrical signals from the first sensor 108, converts the sensor signals to digital data, and communicates the digital data to the electronic processor 205. The first communications port 220 includes a suitable input/output (I/O) interface (for example, digital or analog). In some embodiments, the first communications port 220 may include a serial communications port for communicating with sensors configured to communicate using serial communications. The second communications port 225 functions similarly to the first communications port 220, and is electrically coupled to the second sensor 110 (See FIG. 1).

Figure 3:
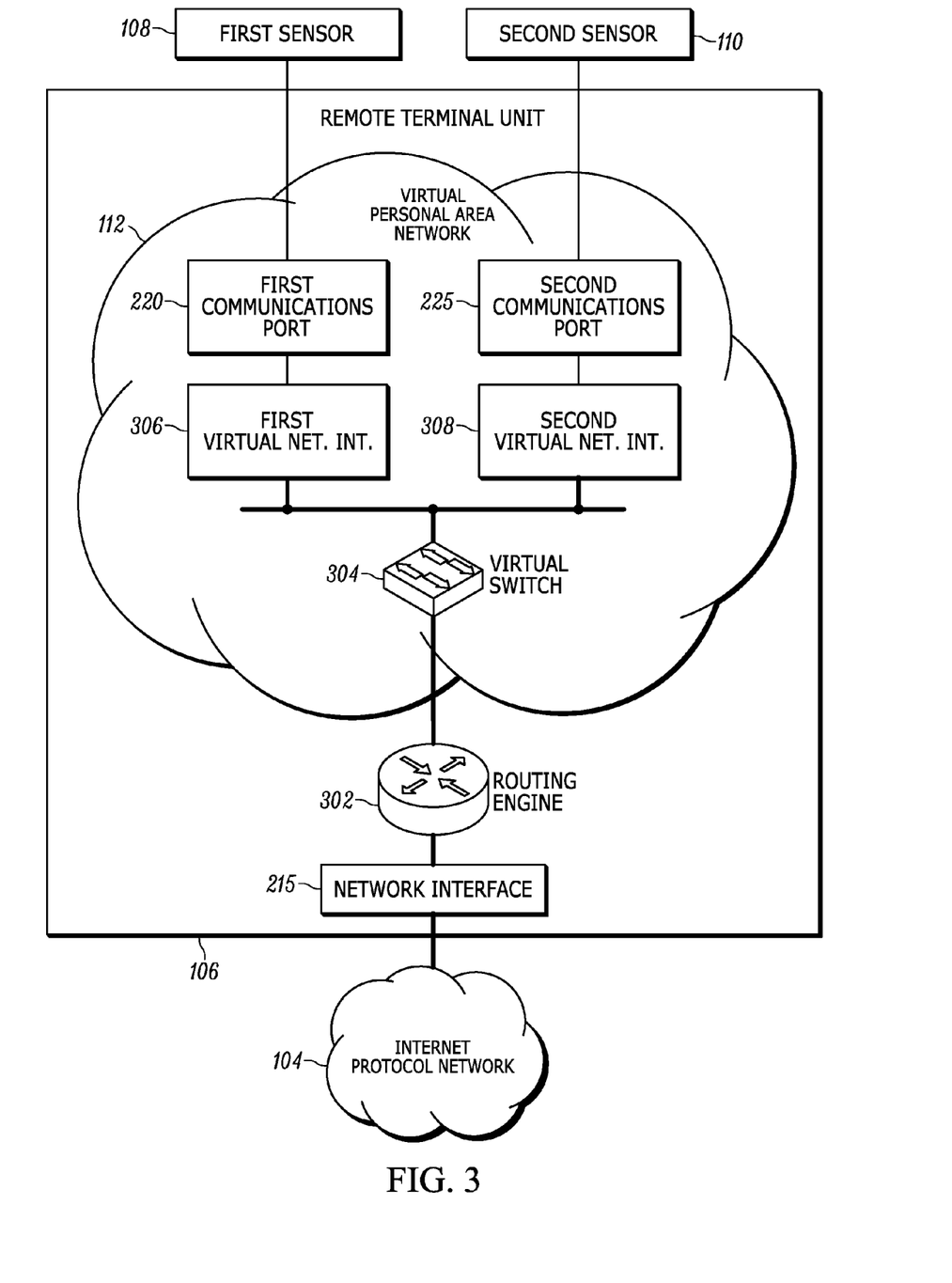
FIG. 3 is a diagram of the remote terminal unit including the virtual personal area network of FIG. 1 in accordance with some embodiments.

FIG. 3 is an expanded diagram of one embodiment of the remote terminal unit 106 including the virtual personal area network 112. For ease of description, the diagram of FIG. 3 illustrates both hardware components and functions (that is, implemented in a combination of hardware and software) of the remote terminal unit 106. In one embodiment, the functions (the routing engine 302, the virtual switch 304, the first virtual network interface 306, and the second virtual network interface 308) are implemented by the electronic processor 205 (using software retrieved from the memory 210 and other hardware (not shown)). In some embodiments, one or more of the virtual components may be a dedicated hardware component.

The routing engine 302 communicates with other routers (not shown) on the internet protocol network 104 using at least one suitable routing protocol (for example, interior gateway routing protocol (IGRP), enhanced interior gateway routing protocol (EIGRP), border gateway protocol (BGP), open shortest path first (OSPF), routing information protocol (RIP), and intermediate system to intermediate system (IS-IS) protocol, or a future-developed routing protocol). The routing engine 302 is communicatively coupled to the virtual switch 304 (and thus, the virtual personal area network 112) and the internet protocol network 104, and routes internet protocol traffic therebetween.

In one example, the virtual switch 304 is a virtual layer-2 Ethernet switch, which switches internet protocol packets between the routing engine 302, the first virtual network interface 306, and the second virtual network interface 308. The virtual switch 304, the first virtual network interface 306, and the second virtual network interface 308 form the virtual personal area network 112. The virtual personal area network 112 may be considered to be a virtual Ethernet local area network within the remote terminal unit 106. Devices participating in the virtual personal area network 112 (for example, the first virtual network interface 306) communicate with devices on the internet protocol network 104 via the routing engine 302. Alternative embodiments combine the routing engine 302 and the virtual switch 304 into a virtual layer-3 switch.

In one embodiment, the first virtual network interface 306 is a virtual Ethernet network interface card, which may be assigned an internet protocol address by the electronic processor 205. The first virtual network interface 306 is communicatively coupled to the first communications port 220. The electronic processor 205 instantiates an internet protocol application set, which is assigned to the first virtual network interface 306 and responds to requests directed to the internet protocol address assigned to the first virtual network interface 306. The internet protocol application set may include, for example, dynamic host configuration protocol (DHCP), simple network management protocol (SNMP), hypertext transfer protocol (HTTP), Modbus protocol, message queue telemetry transport, and distributed network protocol. The internet protocol application set assigned to the first virtual network interface 306 may access, and communicate to the control terminal 102, the digital data that the first communications port 220 generates from the electrical signals received from the first sensor 108. For example, the first virtual network interface 306 may receive a simple network management protocol request for the value currently being read by the first sensor 108, and, in response, return, to the requestor, a simple network management protocol message containing such value.

The second virtual network interface 308 is configured, and operates similarly, to the first virtual network interface 306. The second virtual network interface 308 is communicatively coupled to the second communications port 225 and accesses and communicates digital data from the second sensor 110. Embodiments of the remote terminal unit 106 include more than two communications ports, and thus include one virtual network interface for each communications port.

Figure 4:
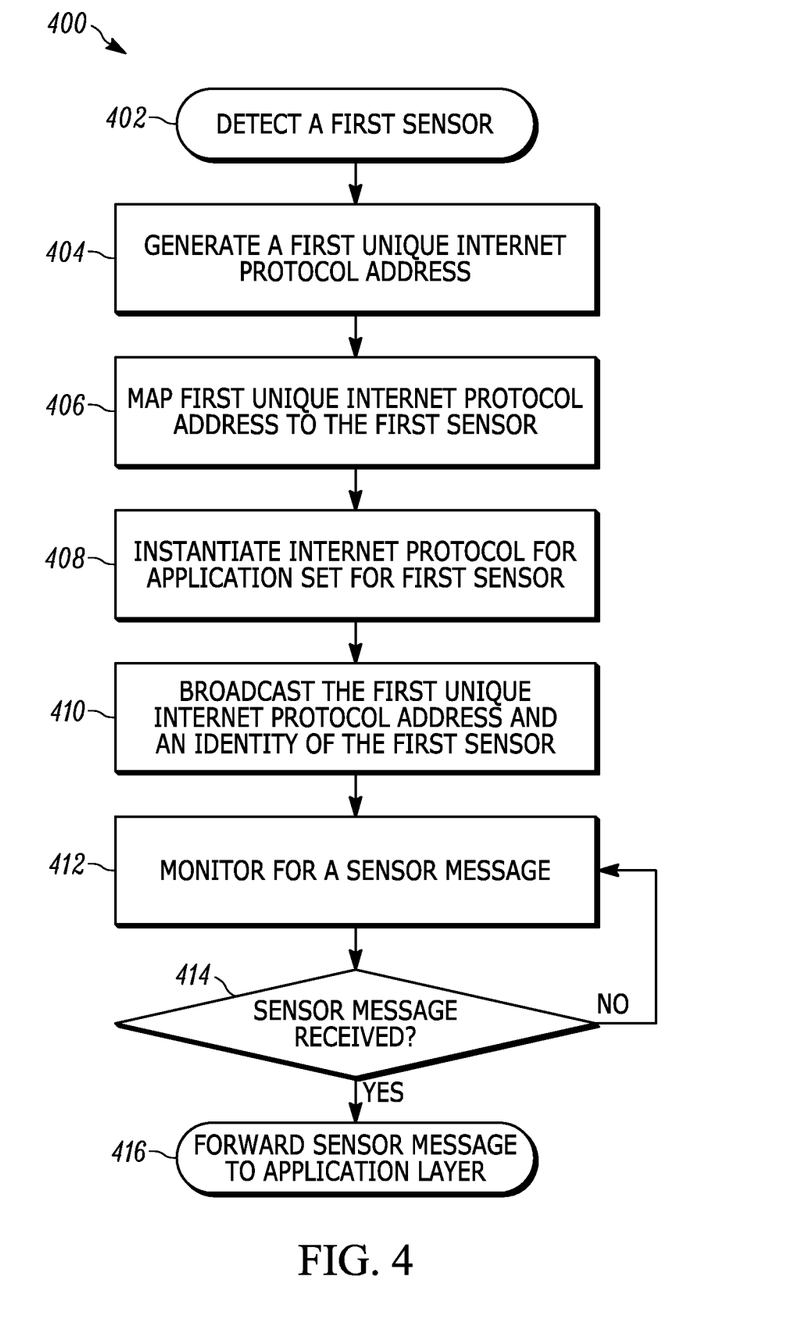
FIG. 4 is a flowchart of a method of providing direct access to one or more sensors in accordance with some embodiments.

As noted above, existing remote terminal units provide only indirect internet protocol communication to sensors. FIG. 4 illustrates an exemplary method 400 for providing direct access to one or more sensors from an internet protocol network 104 via a remote terminal unit 106 coupled to the internet protocol network 104. As an example, the method 400 is described in terms of the first sensor 108, coupled to the first communications port 220 and the first virtual network interface 306. This example should not be considered limiting. Embodiments of the method 400 may be used to provide direct access to one, two, or more sensors.

In the example provided, at block 402, the electronic processor 205 of the remote terminal unit 106 detects the first sensor 108 coupled to the first communications port 220. In some embodiments, detecting the first sensor 108 includes reading metadata for the first sensor 108 from the memory 210. Such metadata may include the type of sensor, configuration settings (for example, how to interpret the electrical signals produced by the sensor), where the first sensor 108 is connected (in this example, the first communications port 220), and what internet applications should be instantiated on the first virtual network interface 306 for the first sensor 108.

At block 404, the electronic processor 205 generates a first unique internet protocol address. In some embodiments, the first unique internet protocol address may be generated via a dynamic host configuration protocol request made from the first virtual network interface 306. Such request may be answered by a dynamic host configuration protocol server implements on locally on the remote terminal unit 106, or by a remote dynamic host configuration protocol server, accessed over the internet protocol network 104. In some embodiments, the electronic processor 205 assigns the first unique internet protocol address from a static pool of internet protocol addresses stored in the memory 210.

At block 406, the electronic processor 205 maps the first unique internet protocol address to the first sensor 108. This mapping occurs at the application layer 240 of the network protocol stack 230 operating on the remote terminal unit 106. Mapping the first unique internet protocol address includes configuring the first virtual network interface 306 to send network messages from, and receive network messages addressed to, first unique internet protocol address.

At block 408, the electronic processor 205 instantiates an internet protocol application set for the first sensor 108. The internet protocol application set may include one or more applications, as described above. In some embodiments, the electronic processor 205 instantiates an internet protocol application set based on the metadata for the first sensor 108.

At block 410, the electronic processor 205, via routing engine 302 over the network interface 215, broadcasts, at the network layer 235 of the network protocol stack 230 operating on the remote terminal unit 106, the first unique internet protocol address and an identity of the first sensor 108. The broadcast is directed to the internet protocol network 104, where such broadcast may be received by the control terminal 102.

At block 412, the routing engine 302 monitors, on the network interface 215, at the network layer 235 of the network protocol stack 230 operating on the remote terminal unit 106 for a sensor message identifying the first unique internet protocol address as the destination address of the message. The sensor message may be, for example, a simple network management protocol request. The sensor message may also include data indicating a state of function of the first sensor 108.

At block 414, when no sensor message is received, the routing engine 302 continues to monitor at block 412. At block 416, when a sensor message is received, the routing engine 302, in response to receiving the sensor message, forwards the sensor message to the application layer 240 of the network protocol stack 230 for further processing. Forwarding the sensor message may include forwarding the sensor message to the first virtual network interface 306. In some embodiments, forwarding the sensor message includes forwarding the message to one or more of the applications of the internet protocol application set instantiated at block 408. In some embodiments, the method 400 may be repeated, sequentially or in parallel, for one or more sensors in a single remote terminal unit (for example, when one or more sensors are repeatedly queried by a control terminal).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for providing direct access to one or more sensors from an internet protocol network via a remote terminal unit coupled to the internet protocol network, the method comprising:
  detecting, by the remote terminal unit, a first dumb sensor coupled to a first communications port of the remote terminal unit;
  creating, by the remote terminal unit, a first virtual network interface card mapped to the first dumb sensor;

generating, by the remote terminal unit, a first unique internet protocol address for the first virtual network interface card representing the first dumb sensor;

instantiating, based on metadata for the first dumb sensor, an internet protocol application set attached to the first virtual interface card representing the first dumb sensor;

broadcasting, by the remote terminal unit over the internet protocol network at a network layer, the first unique internet protocol address and an identity of the first dumb sensor with which the first unique internet protocol address is associated;

monitoring, by the remote terminal unit at the network layer of the internet protocol network, for a sensor message identifying the first unique internet protocol address as a destination address of the sensor message; and responsive to detecting the sensor message, forwarding the sensor message to the application layer via the mapped virtual network interface card for further processing.

2. The method of claim 1, wherein the sensor message includes data indicating a state or function of the first dumb sensor.

3. The method of claim 1,
wherein the internet protocol application set includes at least one application selected from the group consisting of hypertext transfer protocol, simple network management protocol, Modbus protocol, message queue telemetry transport, and distributed network protocol.

4. The method of claim 3, wherein forwarding the sensor message to the application layer includes forwarding the sensor message to at least one application of the internet protocol application set.

5. The method of claim 1, wherein generating the first unique internet protocol address includes requesting the first unique internet protocol address from a dynamic host configuration protocol server.

6. The method of claim 1, wherein
the operations of broadcasting, monitoring, and forwarding are performed by a routing engine communicatively coupled to a network interface of the remote terminal unit and the first virtual network interface; and
the network interface is coupled to the internet protocol network.

7. The method of claim 6, wherein the routing engine communicates with the internet protocol network using at least one routing protocol selected from a group consisting of interior gateway routing protocol, enhanced interior gateway routing protocol, border gateway protocol, open shortest path first, routing information protocol, and intermediate system to intermediate system protocol.

8. The method of claim 6, where in the routing engine communicates with the first virtual interface via a virtual switch communicatively coupled to the routing engine and the first virtual interface.

9. A remote terminal unit for providing direct access to one or more sensors from an internet protocol network, the remote terminal unit comprising:
a network interface coupled to the internet protocol network;
a first communications port;
a memory; and
an electronic processor coupled to the network interface, the first communications port, and the memory, and configured to
detect a first dumb sensor coupled to the first communications port;
create a first virtual network interface card mapped to the first dumb sensor;
generate a first unique internet protocol address for the first virtual network interface card representing the first dumb sensor;
instantiate, based on metadata for the first dumb sensor, an internet protocol application set attached to the first virtual interface card representing the first dumb sensor;
broadcast, via the network interface, over the internet protocol network at a network layer, the first unique internet protocol address and an identity of the first dumb sensor with which the first unique internet protocol address is associated;
monitor, via the network interface, at the network layer of the internet protocol network, for a sensor message identifying the first unique internet protocol address as a destination address of the message; and
responsive to detecting the sensor message, forward the sensor message to the application layer via the mapped virtual network interface card for further processing.

10. The remote terminal unit of claim 9, wherein the sensor message includes data indicating a state or function of the first dumb sensor.

11. The remote terminal unit of claim 9,
wherein the internet protocol application set includes at least one application selected from the group consisting of hypertext transfer protocol, simple network management protocol, Modbus protocol, message queue telemetry transport, and distributed network protocol.

12. The remote terminal unit of claim 11, wherein the electronic processor is further configured to forward the sensor message to at least one application of the internet protocol application set.

13. The remote terminal unit of claim 9, wherein the electronic processor is further configured to request the first unique internet protocol address from a dynamic host configuration protocol server.

14. The remote terminal unit of claim 9, further comprising a routing engine communicatively coupled to the network interface and the first virtual network interface, configured to broadcast, monitor, and forward.

15. The remote terminal unit of claim 14, wherein the routing engine communicates with the internet protocol network using at least one routing protocol selected from a group consisting of interior gateway routing protocol, enhanced interior gateway routing protocol, border gateway protocol, open shortest path first, routing information protocol, and intermediate system to intermediate system protocol.

16. The remote terminal unit of claim 14, further comprising a virtual switch, communicatively coupled to the routing engine and the first virtual interface.

* * * * *